United States Patent [19]
Rupp et al.

[11] Patent Number: 5,339,431
[45] Date of Patent: Aug. 16, 1994

[54] SOFTWARE COMPILER AND LINKER WITH IMPROVED LINE-NUMBER TABLE

[75] Inventors: Richard R. Rupp; Gary A. Coutant; Joseph A. Coha, all of San Jose, Calif.

[73] Assignee: Hewlett-Packard Company, Palo Alto, Calif.

[21] Appl. No.: 931,641

[22] Filed: Aug. 17, 1992

Related U.S. Application Data

[63] Continuation of Ser. No. 422,125, Oct. 16, 1989, abandoned.

[51] Int. Cl.$^5$ .............................................. G06F 15/38
[52] U.S. Cl. .................................... 395/700; 364/280.4; 364/280.7; 364/DIG. 1
[58] Field of Search .............................. 395/650, 700

[56] References Cited

U.S. PATENT DOCUMENTS

| | | | |
|---|---|---|---|
| 4,667,290 | 5/1987 | Goss et al. | 364/300 |
| 4,791,550 | 12/1988 | Stevenson et al. | 364/200 |
| 4,791,558 | 12/1988 | Chaitin et al. | 364/200 |
| 4,922,415 | 5/1990 | Hemdal | 364/200 |
| 5,051,893 | 9/1991 | Tenny et al. | 364/200 |
| 5,247,678 | 9/1993 | Littleton | 395/700 |
| 5,261,103 | 11/1993 | Takeuchi et al. | 395/700 |

OTHER PUBLICATIONS

Birnbaum et al., "Beyond RISC: High–Precision Architecture", Hewlett-Packard Journal, Aug. 1985, pp. 4–10.

Coutant et al., Compilers for the New Generation of Hewlett–Packard Computers, Hewlett-Packard Journal, Jan. 1986, pp. 4–18.

*Primary Examiner*—Gareth D. Shaw
*Assistant Examiner*—John Q. Chavis
*Attorney, Agent, or Firm*—Peter P. Tong

[57] ABSTRACT

A compiler-linker software system translates a source code file into a machine executable code file. The compiler converts source code files to corresponding object code files. The linker converts the object code files to machine executable code files and tables required for execution. For each procedure, the linker derives one or more tables and one of the tables is a line number table. The line number table identifies the offset of a block of machine executable codes in the procedure with their corresponding source code line number. The construction of the line number table at link-time, not at compile-time, enables all changes to the sequences of machine executable codes and addresses to be accommodated without requiring supplemental processing of the line number table. The line number table includes a first entry showing the offset from the start address of the machine executable codes to the first machine executable code generated by the first source code line, a second entry showing the line number of the first source code line, and subsequent pairs of entries. One entry of a pair is the numeric difference between succeeding source code line numbers. The other is the difference between the offsets of the machine executable codes generated by the corresponding succeeding source code lines.

1 Claim, 5 Drawing Sheets

| SOURCE CODE LINE # | FIRST MACHINE INSTR. OFFSET GENERATED FOR CORRESPONDING SOURCE CODE LINE |
|---|---|
| 1 | 0 |
| 2 | 10 |
| 3 | 30 |
| 4 | 430 |
| 200 | 440 |

FIG. 4.

LINE NO. TABLE

| VERSION # | | | – |
|---|---|---|---|
| OFFSET OF 1ST. MACHINE INSTRUCTIONS GENERATED BY FIRST SOURCE LINE | | | 0 |
| FIRST SOURCE LINE NO. | | | 1 |
| 10 | 1 | 20 | 1 |
| 250 | 0 | 150 | 1 |
| 10 | 127 | 0 | 69 |
| 255 | – | – | – |

LINE NO. MEANING TABLE

| ENTRY # IN LINE # TABLE | SOURCE LINE | MACHINE INSTR. OFFSET |
|---|---|---|
| 102, 104 | 1 | 0 |
| 105, 106 | 2 | 10 |
| 107, 108 | 3 | 30 |
| 110, 111 | 3 | 280 |
| 112, 113 | 4 | 430 |
| 114, 115 | 131 | 440 |
| 116, 117 | 200 | 440 |

SOFTWARE COMPILER AND LINKER WITH IMPROVED LINE-NUMBER TABLE

CROSS REFERENCE TO RELATED APPLICATION

This is a continuation of copending application Ser. No. 07/422,125 filed on Oct. 16, 1989, now abandoned.

FIELD OF THE INVENTION

This invention relates to software compiler systems, and more particularly to a software compiler and a linker wherein a line-number table is produced.

BACKGROUND OF THE INVENTION

In regards to the prior art and this invention, certain terms of art will be used and are summarized hereinafter. A file in a computer system is a logical grouping of contiguous information identified with a name. A compiler is a program that translates a source code file into an object code file that contains machine instructions and additional symbolic information. In order to produce an executable file, the object code file output from the compiler requires modifications. A linker (also referred to as a "link editor") is a program that produces executable files from one or more files of non-executable object code. The executable file can be loaded and executed directly on the computer. The primary purpose of linkers is to resolve references to data or addresses in an object code file that are not able to be resolved by the compiler from the information contained in the source code file.

A compiled procedure is a block of executable code with a start address and is derived from a logical sequence of statements in a source code file. A program is a procedure with a start address that is recognized by the operating system. Execution of a procedure in the executable file is initiated by changing the value of the computer's program counter to be equal to the start address. At a higher level, in the source code file, this is often accomplished by means of a procedure call. In certain software systems, a plurality of source code compilers are provided for translating from a variety of source codes (e.g., BASIC, Ada, FORTRAN, C, etc.) to a common object code file format.

Compilers convert procedures in a source code file to an object code file representation that contains discrete blocks of machine instructions for each procedure in the source file as well as additional information that is symbolic in nature. The symbolic information is added to the object code file by the compiler because the compiler is unable to obtain all of the information required to generate the correct object code machine instructions from the source code file. The linker uses the symbolic information to modify machine instructions in the object code file and thus creates an executable file. This process is referred to as address fixup.

In many compilers, tables are constructed at compile-time that are meant for use when an exception (error) condition occurs. At link-time, such tables, along with other information, are added to the executable file. The resulting executable file is then able to be loaded and executed.

One such table is a line number table which is built during compile-time and includes a pair of numeric values for each line in the source code file. The first numeric value is a source code line number and the second numeric value is the offset of the first machine instruction in the object code file that results from the translation of that source code line into machine instructions. Thus, a line number table for a procedure associates a range of machine instruction offsets with a corresponding source code line in that source code file.

If an exception occurs during execution of an executable file, the block of machine instructions in which the exception occurred can be determined by reference to the line number table for that block of instructions (the compiled procedure). The information relating the machine instruction offset to the source code file line number in the line number table is used to determine the line number in the source file that was responsible for generating the machine instruction at which the exception occurred. Reference to that source code file line number assists the system user in troubleshooting the cause of the exception. The information in the line number table also permits recovery of execution at the machine instruction that corresponds to either the same source line as or the source line subsequent to the source line in which the exception occurred.

Line number tables in the prior art have employed one of two methods. The first method was to allocate a sufficient number of bytes for each entry in the line number table to accommodate the largest source code line number and a sufficient number of bytes to accommodate the largest machine instruction offset. As a result, line number tables using this method have heretofore consumed considerable space in the executable file. The second method was to pack the table by using a smaller number of bytes that would accommodate most, but not all of the cases. The disadvantage of this approach is that it adds complexity to the tables and the traversal method, in that there has to be some special value to indicate the special cases where the data will not fit in the table, and the traversal method has to handle this special case.

In the past, linkers did not change the number or sequence of machine instructions in object code files produced by the compilers. Thus, machine instruction offsets calculated during compile-time were the final machine instruction offsets in the executable file. Recently, however, linkers have become more sophisticated and have the ability to modify or eliminate machine instructions from the object code file that is generated by the compiler. Under such conditions, if line number tables are generated during compile-time, they must be updated to take into account such link-time modifications. This requires both complex "bookkeeping" of address modifications and consumes considerable processing time.

Accordingly, it is an object of this invention to provide a compiler and linker software system wherein line number tables need not be modified once they are first produced.

It is still another object of this invention to provide a line number table which occupies less storage than heretofore.

It is still another object of this invention to provide a system that determines a line in a source code file that generates a given machine instruction in an executable file and also identifies a file name and procedure name within which the source code line resides.

SUMMARY OF THE INVENTION

A compiler and linker software system translates a source code file to a machine executable file. A compiler converts source code files to object code files that contain both machine instructions and additional information that is required to convert the object code file to an executable file. A linker converts the object code file, or multiple object code files, into an executable file. The linker executes a series of operations which includes resolving external references, performing fix-ups on machine instructions generated by the compiler, and building additional tables. One of these tables, built for each procedure, is a line number table which correlates the offset of a machine instruction from the beginning of a procedure's start address with a line in a source code file. The construction of the line number table at linktime, rather than at compile-time enables all address changes to be accommodated without supplemental processing.

The line number table is produced for each procedure through the steps of: providing a first entry indicating a start offset from the start address of the procedure to the first machine instruction generated by a source code line in the source code file; providing a second entry indicating a start source code line number which is the line number of the first line of source code for the procedure; and providing a plurality of pairs of difference entries for machine instructions and the corresponding source code file line number. One difference entry of the pair is the numeric difference between succeeding source code lines and the other is the difference between the offsets of the first machine instruction in the block of machine instructions generated by each of those same two succeeding source code lines.

DETAILED DESCRIPTION OF THE INVENTION

A software system, such as will be described below, may be run on any processor which is adapted to handle compiler and linker functions. A preferred processor system is one of the Hewlett Packard Precision Architecture computers. The architecture and compilers used with the Precision Architecture computers is described by Birnbaum, et al., in "Beyond RISC: High Precision Architecture" HP Journal August 1985 pp. 4-10; and by Coutant, et al., in "Compilers for the New Generation of Hewlett-Packard Computers" HP Journal January, 1986, pp. 4-18.

Figure 1:
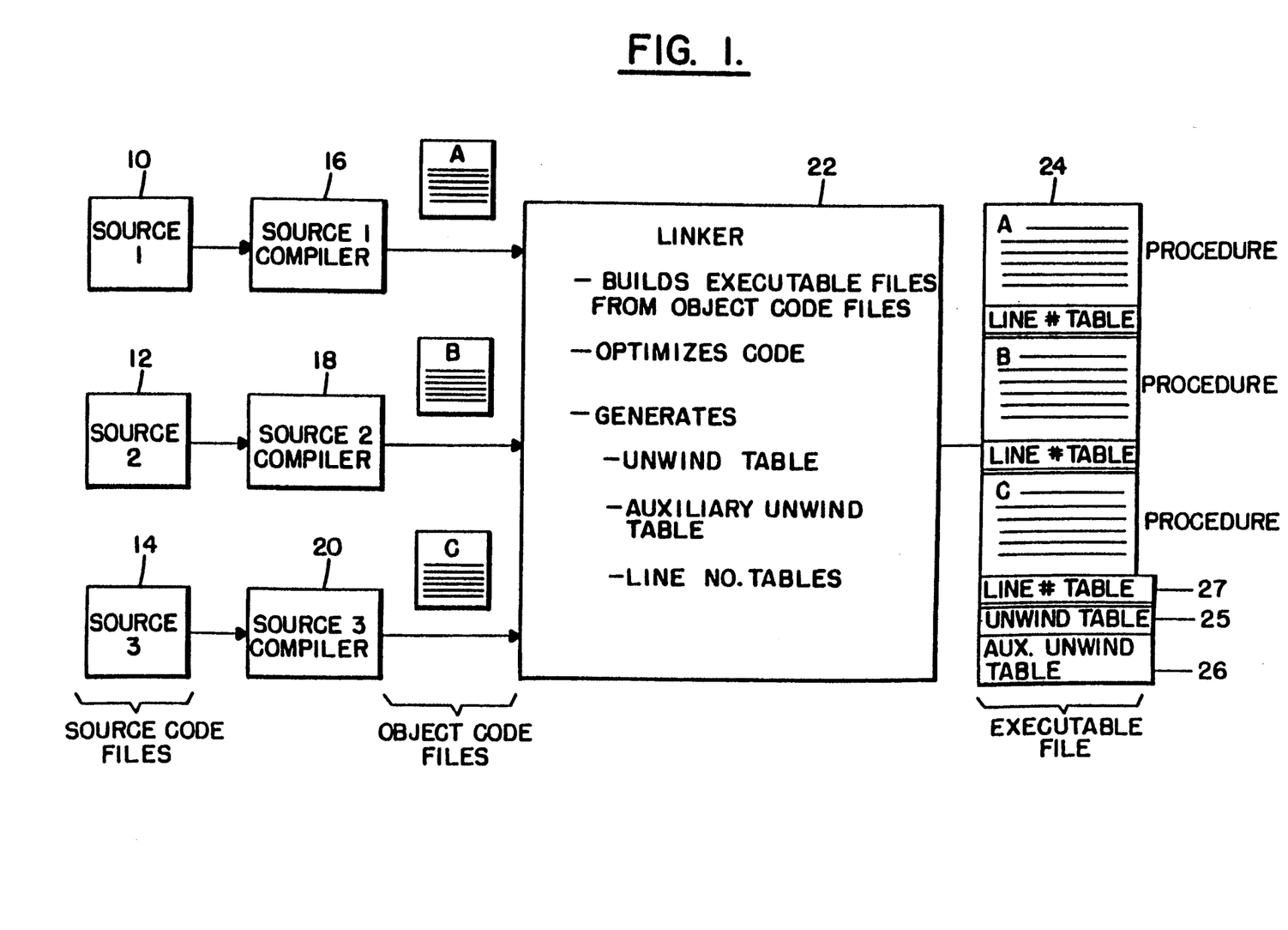
FIG. 1 is a functional block diagram showing the various elements of a compiler/linker software system which incorporates the invention.

Referring now to FIG. 1, a software system block diagram illustrates a number of different source code files 10, 12, and 14. Each source file is provided to an associated compiler 16, 18 and 20. Each of the source code files 10, 12, 14 can be written in one language or in different languages. If all are written in the same language then compilers 16, 18 and 20 will be the same. Otherwise, each of compilers 16, 18, 20 is that which is designed to compile the source contained in the corresponding source code file. Each of compilers 16, 18, 20 produces an object code file that contains machine instructions that reflect the intent of the instructions in the source code file. The object code to be produced by the compiler is not executable because additional information is required to fix up some of the machine instructions.

As shown in FIG. 1, "Source 1" compiler 16 produces an object code file for procedure A; "Source 2" compiler 18 produces an object code file for procedure B; and "Source 3" compiler 20 produces an object code file for procedure C. Linker 22 then reads each object code file for procedures A, B, and C, and determines how the machine instructions and any additional tables will be organized in executable file 24. When this is done, machine instructions in each of the procedures which require modification can be modified.

Linker 22 performs certain code optimizations resulting in more efficient machine instruction sequences being added to the executable file. For each procedure, linker 22 generates an unwind table entry in unwind table 25, an auxiliary unwind table entry in auxiliary unwind table 26, and a line number table 27. The format of these tables and their entries will be described below. All of these tables and information are added together with the machine instructions to result in executable file 24.

Figure 2:
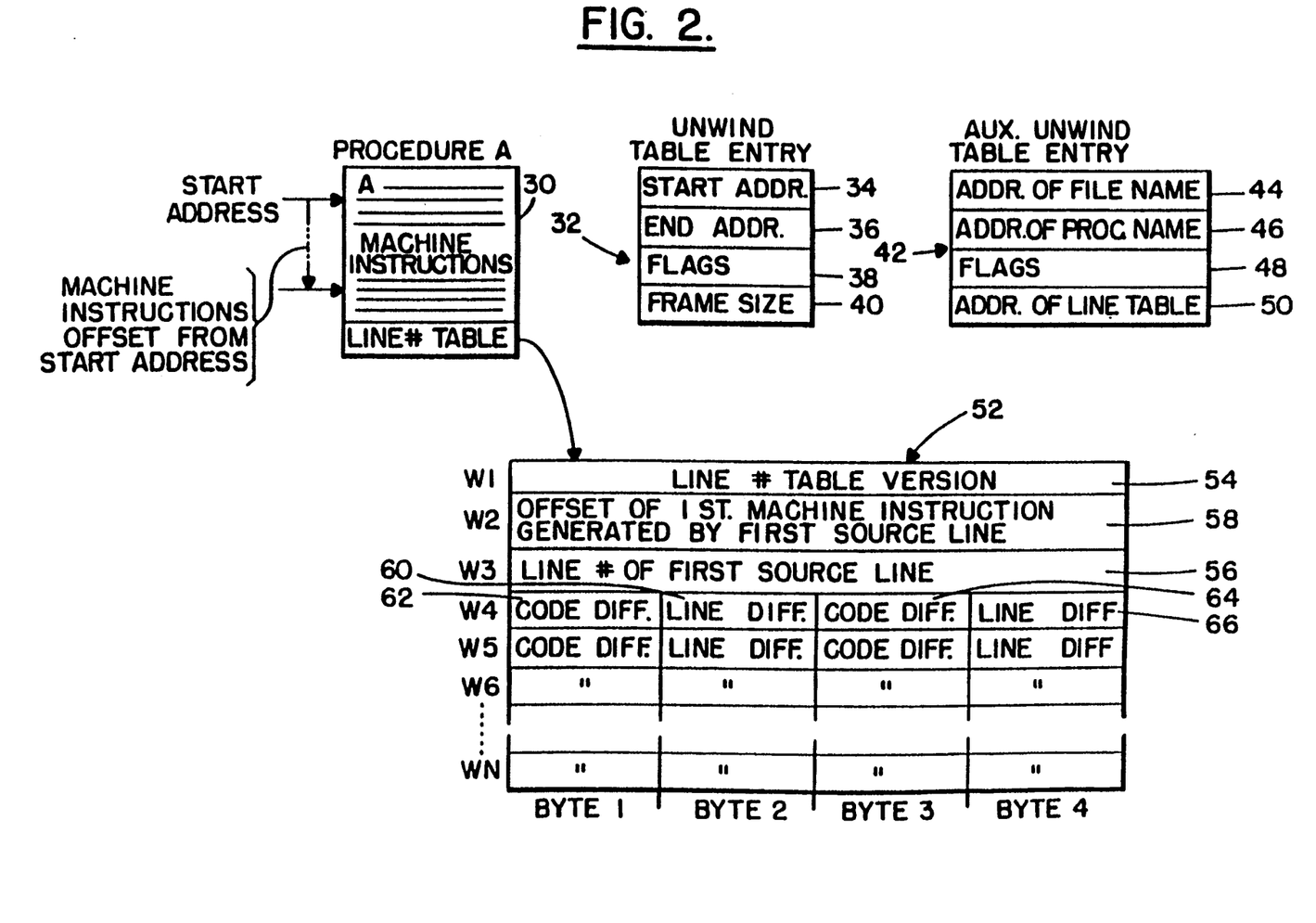
FIG. 2 is a functional block diagram which illustrates various tables employed with the invention.

In FIG. 2, the structures of the above-mentioned tables are illustrated. For the purpose of this description, procedure A in executable file 24 will be denoted by 30 and will be hereinafter considered. Procedure A's unwind table entry is denoted as 32 and its auxiliary unwind table entry is denoted as 42. It is to be understood that the processing of each procedure results in the generation of a line number table and one entry in each of the unwind and auxiliary unwind tables. The locations of all tables and machine instructions in the figures are a logical representation for illustration and do not represent the physical position of the information in the executable file.

Unwind table entry 32 includes four fields per entry and there is one such entry per procedure, so if there are N procedures there will be N entries of 4 fields each. Field 34 is the start address of the first machine instruction for procedure A in the executable file. The value of this field is the virtual address of that instruction when the executable file is loaded for execution. Field 36 is the address of the last machine instruction generated for procedure A in the executable file. The value of this field is the virtual address of that instruction in the executable file. Fields 38 and 40 include information not relevant to this invention.

A table parallel to the unwind table is the auxiliary unwind table. An auxiliary unwind table entry 42 has four fields per entry and there is one such entry per procedure. Field 44 is the address of a string of characters stored in the executable file which has as its value, the name of the source code file read by the compiler when the procedure A source code was compiled. Field 46 is the address of a string of characters also stored in the executable file which has as its value, the name of procedure A. Field 48 contains information that is not relevant to this invention. Field 50 is the address of the start of line number table 52 for procedure A.

Line number table 52 comprises a plurality of words W1–Wn, each of which is a plurality of bytes in width. In this example, it is assumed that each word is 32 bits long and comprises four bytes (a byte being 8 bits long).

The first field 54 in line number table 52 is the version number of the table and is a full word in width. Field 56 is a full word in width, occupies the third word in table 52, and identifies a line number of a source code line in procedure A in source code file 10. The translation of that source code line into machine instructions generates a sequence or block of machine instructions. Field 58 occupies the second word of table 52 and identifies the machine instruction offset from the procedure A start address to the first machine instruction in the block of machine instructions which is generated by the source code line specified in field 56.

All machine instruction offsets are calculated from the start address of the procedure. The linker can assign the value to field 58 because the offset is known at link-time. It should be understood, that often there are a number of machine instructions involved in housekeeping, often referred to as entry code, which precede the first machine instruction generated by a source code line. Therefore, the offset of the first machine instruction in the block of machine instructions generated from the first line of source code is not always zero.

Given the start address of procedure A (obtainable from the field 34 in unwind table 32 and the machine instruction offset in field 58), the virtual address of the first machine instruction in the block of machine instructions generated by the source code line number specified in field 56 can be readily identified.

Following field 56, line number table 52 is provided with an indeterminate number of additional words W4–Wn. The total number of words is determined by the number of source code lines in the source code file as well as directives included in the object code file by the compiler that transmit the source code line number information to the linker. In each additional word, a two byte entry is made for each source code line subsequent to the first in the source code file. Thus, each additional word has two entries, each of which is two bytes in length. Each of these bytes is a field in the entry. The second field of each entry identifies a difference between a current source code line number and the previous line number. The first field of each entry identifies a corresponding machine instruction offset difference between the beginning of the block of machine instructions generated by the current source code line and the beginning of the block of machine instructions generated by the previous source code line. The second two byte entry does the same except that it refers to a subsequent line and offset. Note that, to conserve memory, only difference values are stored in each of the fields.

For example, field 60 contains the line number difference between the first source line number in word 56 and the next source line. Field 62 is the difference between the offset of the first object code instruction generated by the source line in field 56 and the offset of the first instruction generated by the next source code line. Each succeeding pair of fields comprises a machine instruction offset difference and a source line number difference. These values are therefore, the differences of machine instruction offsets and line numbers between previous and current corresponding elements. Thus, field 64 will indicate the difference between the offset that generated field 62 and the offset of the first machine instruction generated for a source line entry following the one that generated field 60. The line difference in field 66 will indicate the difference between the line number that generated the value in field 60 and the line number of the next source line.

The machine instruction offset values range from 0–255 (i.e., as limited by 8 bits). The line number difference values are signed and range from −128 to +127. The latter convention has to do with a requirement of the Ada language and is not to be thought of as limiting the invention. In essence, each byte enables an offset or line number difference of 256 to be indicated. For most circumstances, 8 bits will be sufficient for both the offset and line number differences between succeeding entries in the line number table. For entries that have values that exceed the range that can fit into a one byte field, the table employs multiple entries and the algorithm for examining line number table 52 takes such multiple entries into account. This will be described in detail in the example given in FIG. 3.

By using only difference values between succeeding machine instruction offsets and between succeeding source code line numbers, the space required for a line number table can be greatly reduced, e.g., up to 75% of what was required when full offsets and/or line numbers were listed. Furthermore, by creating a line number table during link time (following all modifications to the machine instructions, sequences of machine instructions and addresses), no further processing of the table is required after its generation.

Figure 3:
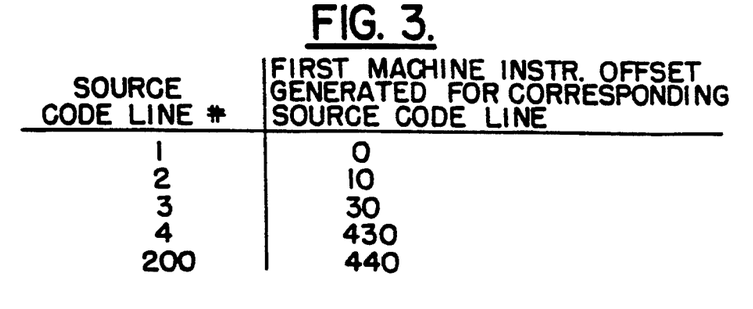
FIG. 3 is an exemplary table containing pairs of values that comprise a source code line number and an offset from a procedure's start address to the first machine instruction generated by that source code line.

Turning now to FIGS. 3–6, there is shown a line number table example and an algorithm for examining the various tables described above. In FIG. 3, an example of corresponding source code lines and offsets of the first machine instructions generated by those lines is illustrated. This information is processed at link time from information supplied by the compiler. Note that the compiler has passed along requests for only five entries to be added to the line number table and these requests are for lines 1, 2, 3, 4 and 200. In the example, it is assumed that source code lines 1, 2, 3 and 4 generate blocks of machine instructions that begin at offsets 0, 10, 30, and 430 from the start address.

Subsequent to source code line 4, it is further assumed that many lines of the source are taken up with comments and therefore do not generate corresponding machine instructions. The compiler provides information which determines whether a source code line number should or should not be entered in the line number table. The next succeeding source line which has a corresponding machine instruction is source line 200 and the corresponding first machine instruction generated for that source code line is at offset 440 from the procedure's start address.

Figure 4:
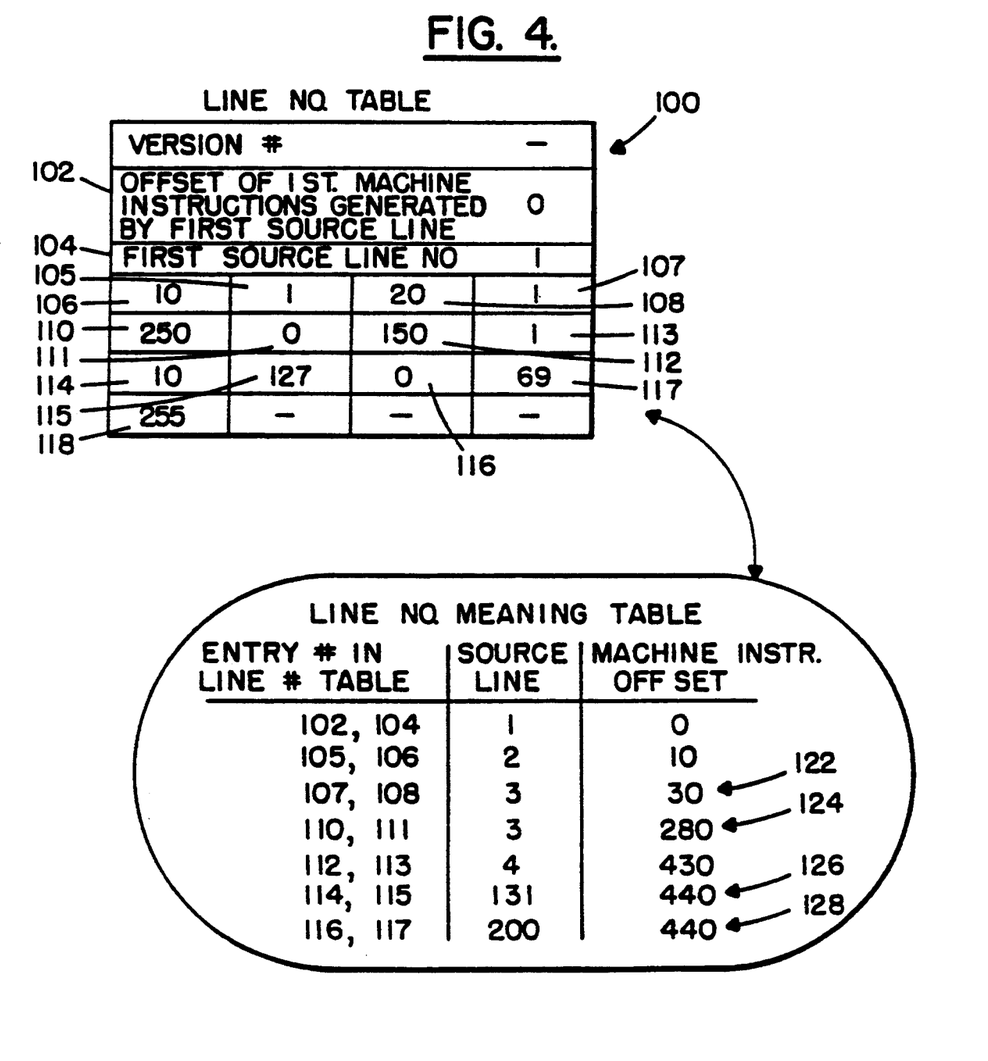
FIG. 4 is a block diagram which will aid in an understanding of the meaning of the various entries in the line number table and is to be read in conjunction with the example in FIG. 3.

In FIG. 4, the data from the example in FIG. 3 is indicated by entries in line number table 100. Below line number table 100 is a "meaning" table which indicates the meaning of each of the entries in the table. Entry 102 indicates that the first source line generates a block of machine instructions in the executable file that begins with the instruction that has an offset of zero from the start address of procedure A. Entry 104 indicates that the number of the source line which generates the block of code beginning at offset 0 is source line 1.

There are two values stored in fields 105 and 106. The value in field 106 is the difference between:

1. the offset of the first instruction in the block of machine instructions generated by the first source line, and
2. the offset of the first instruction in the block of machine instructions generated by the next source line.

The value is also the length of the block of machine instructions generated by source line 1. Adding the value of 10, stored in field 106, to the offset for line 1 that is stored in word 102 results in the offset of the first instruction in the block of instructions for the next source line. The value stored in field 105 is a 1 and represents the source line difference between the first source line value stored in field 104 and the subsequent source line. Thus, to determine the actual number of the subsequent source line, the values of the first source line number and the source line difference are added. The sum is the number of the subsequent source line in the source file. That value is 2. The values in fields 107 and 108 indicate that source line 3 has a difference of 1 from the previous source line number and that the corresponding difference between the first instruction in each of the blocks of machine instructions generated by the source lines has a difference of 20 (i.e., 30−10=20).

The values in fields 110, 111, 112, and 113 are included to demonstrate a case where a difference in machine instruction offsets exceeds 256. As can be calculated from the information supplied in FIG. 3, the difference between machine instruction offset 30 and machine instruction offset 430 is 400 (too great to be represented in an 8 bit byte). Therefore, it is represented by two pairs of fields. Field 110 indicates a value of 250 for succeeding machine instructions offset difference and field 112 indicates a machine instruction offset difference of 150. The corresponding source code line differences in fields 111 and 113 are 0 and 1, respectively. Thus, in the line number table, there are two lines for line number 3. These correspond to entries 122 and 124 in the "meaning" table in FIG. 4. One entry starts at machine instruction offset 30 and the other starts at offset 280.

The algorithm which examines the entries in line number table 100 may find the offset in either of these two pairs. For example, if the offset being searched for is 50, it will be found in entry 122 of the meaning table (FIG. 4). If the offset being searched for is 330, it will be found in entry 124 of the meaning table. In either case, the line number produced is the correct value 3. Thus, a line of source code whose resultant object code is too long to be represented with one entry simply uses multiple entries in the standard format, rather than employing a special purpose entry for such a case.

Since the difference between source lines 3 and 4 is 1, a value of 1 has been entered in the source line difference field 113. The value is added to previously accumulated source code line number differences to determine the line number in the source code.

Source code line number differences which have a value greater than the range that is able to be stored in a source line difference field are handled by multiple entries similar to the method used for large machine instruction offset differences. Very large source code line number differences use a special entry, 252, from a reserved set of values between 251 and 254, inclusive, that specifies that the next entry is an absolute line number.

The multiple entry method for encoding large source code line number differences is shown by the next pair of fields in the line number table. Field 114 indicates that the machine instruction offset difference between the offset of the first machine instruction generated by the current source code line and that of the previous one is 10. Field 115 indicates that the source line difference is at least 127, which difference is interpreted by the algorithm as entry 126 in the "meaning" table. Field 116 has a zero (machine instruction offset difference) and field 117 has a 69 (source code line difference). These values result in entry 128 in the "meaning" table. Note that because of the nature of the traversal algorithm described below, entry 126 in the "meaning" table will never be the end point in a search, so it does not matter that it introduces a non-existent source line number, 131, during the processing of the line number table. The last field in the line number table 100, field 118, has the value 255 to indicate the end of the table.

The interpretation of the above fields will be described in conjunction with the flow diagram of FIGS. 5 and 6. Those Figs. illustrate a line number identification algorithm which is used to identify the source code line which has generated a machine instruction at an address in an executable file. Often this is used to identify the source line at which an exception occurs when only the information in the executable file and a virtual address at which the exception occurred are known.

Assuming that the execution of procedure A results in an exception, the address at which the exception occurs is stored (box 150). The value is the address for which a corresponding source line number will be searched for in the line number table. The address of the unwind table entry and the corresponding auxiliary unwind table entry are calculated (box 151). The algorithm then uses the start address from the unwind table to calculate the machine instruction offset from the start address of the location being searched for within procedure A (box 152). From the auxiliary unwind table the following are determined: address of the file name (box 153), procedure name (box 154) and the line number table (box 155).

The algorithm then obtains from fields in the line number table both the offset of the first machine instruction generated by the first source line and the first source line number and assigns the values to variables that will be used as accumulators (boxes 156 and 157).

As shown in decision box 158, the algorithm then determines whether the value of the machine instruction offset accumulator variable's value is greater than the machine instruction offset of the instruction being searched for. If the value is greater than the offset being searched for, then the location is in the entry code for procedure A (code between start address and the first machine instruction generated by a source code line). The line number variable is assigned a zero (box 159) to indicate, by convention, that the location of the offset being searched for is prior to the machine instructions generated for the first source code line in the source code file. The algorithm ends with the line number variable assigned the correct value (box 168) to return to the caller.

Otherwise, following decision box 158, a pointer is assigned (box 160) that will point to the first pair of difference fields in the line number table. The value of the machine instruction offset difference field is assigned to a local variable in box 161. The value of this machine instruction offset difference variable must be tested to ensure that the value is within the range of the machine instruction offsets (box 162) that are not specially handled. In this example, values greater than 250 are reserved for special cases and an end of table indicator. If the value of the machine instruction offset difference is greater than the maximum value, then the machine instruction offset difference is tested in decision box 169 to determine if it is an end of table indicator. If so, then the line number is the value in the source line number accumulator variable and that value is assigned to the line number variable (box 170). The algorithm ends with the line number variable assigned the correct value (box 168) to return to the caller. This processing would occur in the example in FIG. 4 if the offset of the exception was greater than 440. Fields 116, 117 would have been processed and the variables accumulating the differences would have the values specified by entry 128 in the "meaning" table. Thus, the value 200 for the line number of the last line would be correctly assigned in box 170.

If, at decision box 162, the machine instruction offset difference is within the range of values that are to be interpreted as a machine instruction offset difference then the line number variable is assigned the value in the source line number accumulator variable (box 163). The assignment indicates that the offset being searched for did not occur in the previous line. The values of the current difference pairs are added to the machine instruction offset accumulator variable and source line number accumulator variable in boxes 164 and 165, respectively.

The value of the machine instruction offset accumulator variable is compared with the offset being searched for in decision box 166. If the algorithm has processed the next entry and exceeded the value of the offset being searched for, then the decision box 166 test will succeed. If the line number value stored at box 163 is not the same as the value in the source line number accumulator variable for the test at decision box 167, then the algorithm can exit with the correct value assigned to the line number variable when the value is returned at box 168.

The decision box 167 is present for the case where there are multiple byte pair entries required for a source line because the machine instruction offset difference exceeds the largest value that can be stored in that field of the line number table. Continued processing by the algorithm occurs if the line number difference value is zero. This is a result of the unchanged value of the source line number accumulator variable when the new line number difference is added in box 165. The continued processing by the algorithm insures that the machine instruction offset accumulator is incremented to the first instruction of the next line, should the return of that value be required. If this value is not important, then this test can be eliminated.

As an example, consider the processing that would occur for the example presented in FIG. 4 if the offset being searched for was 15 and pair 105, 106 had just been processed. Pair 107, 108 is currently being processed after execution of box 172. The assignment at box 163 would assign 2 to the line number variable. The new machine instruction offset accumulator value assigned in box 164 is 30. The new source line number accumulator variable value assigned in box 165 is 3. In comparing the machine instruction offset accumulator with the offset being searched for in box 166, the machine instruction offset accumulator, 30, is found greater than 15. Therefore, the next step is to compare the value of the line number variable, 2, with the value in the source line number accumulator variable, 3, in box 167. The two values are not equal, so the algorithm ends (box 168) returning the current value of the line number variable which is the correct value, 2.

If, in the example, the value of the machine instruction offset accumulator variable is less than or equal to the offset being searched for in box 166 or the value of the line number variable is equal to the value of the source line number accumulator variable in box 167 (or following special case handling in box 171) then the address of the next byte pair in the line number table is assigned to the pair pointer variable (box 172). Execution of the algorithm resumes at box 161.

Consider the following sequence of steps that would occur during the processing of the example in FIG. 4 if the offset being searched for was greater than 440.

Figure 5:
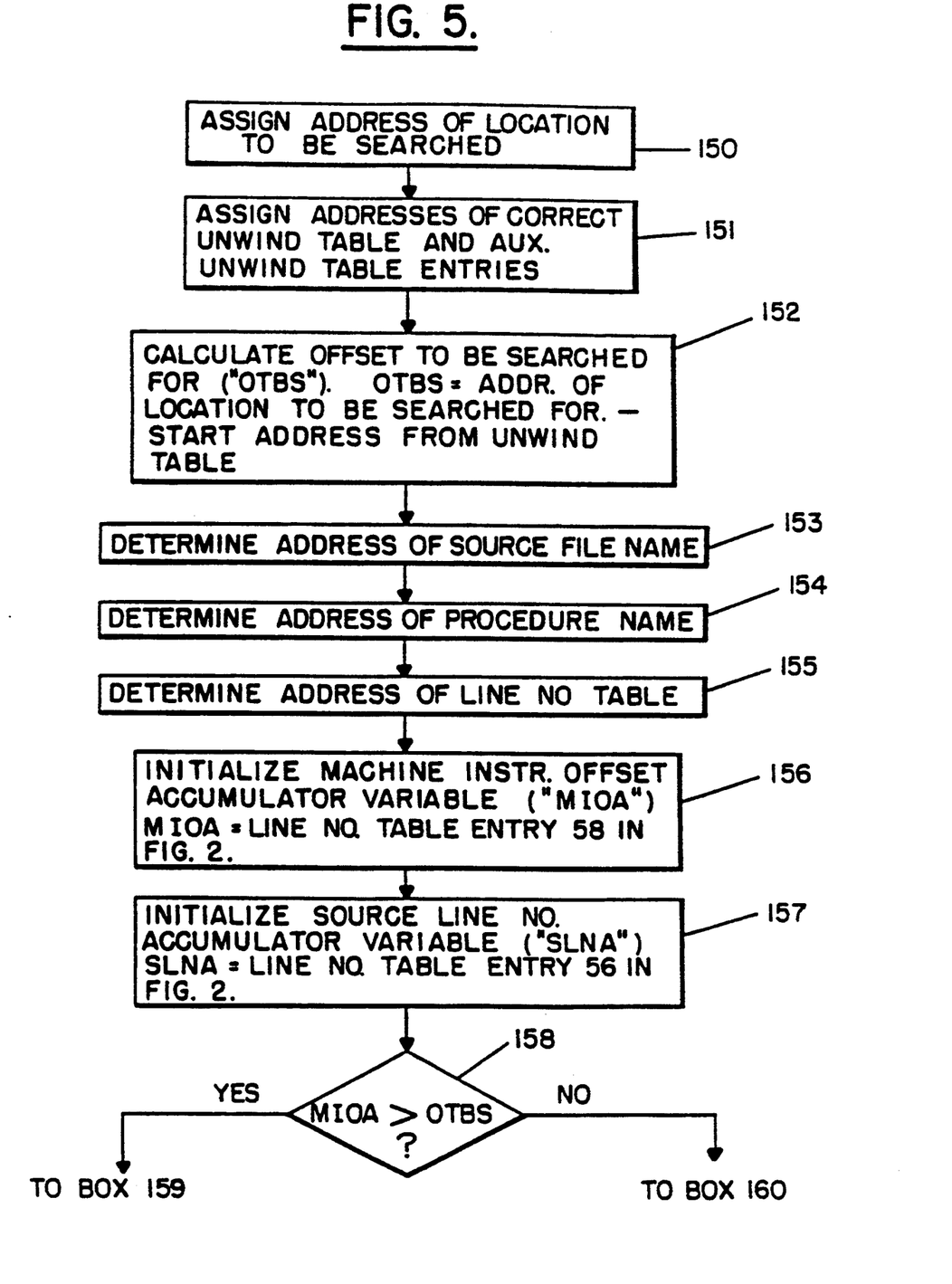
FIGS. 5 and 6 are flow diagrams of a line number table traversal algorithm used to obtain information from the line number table when an address is known.
Figure 6:
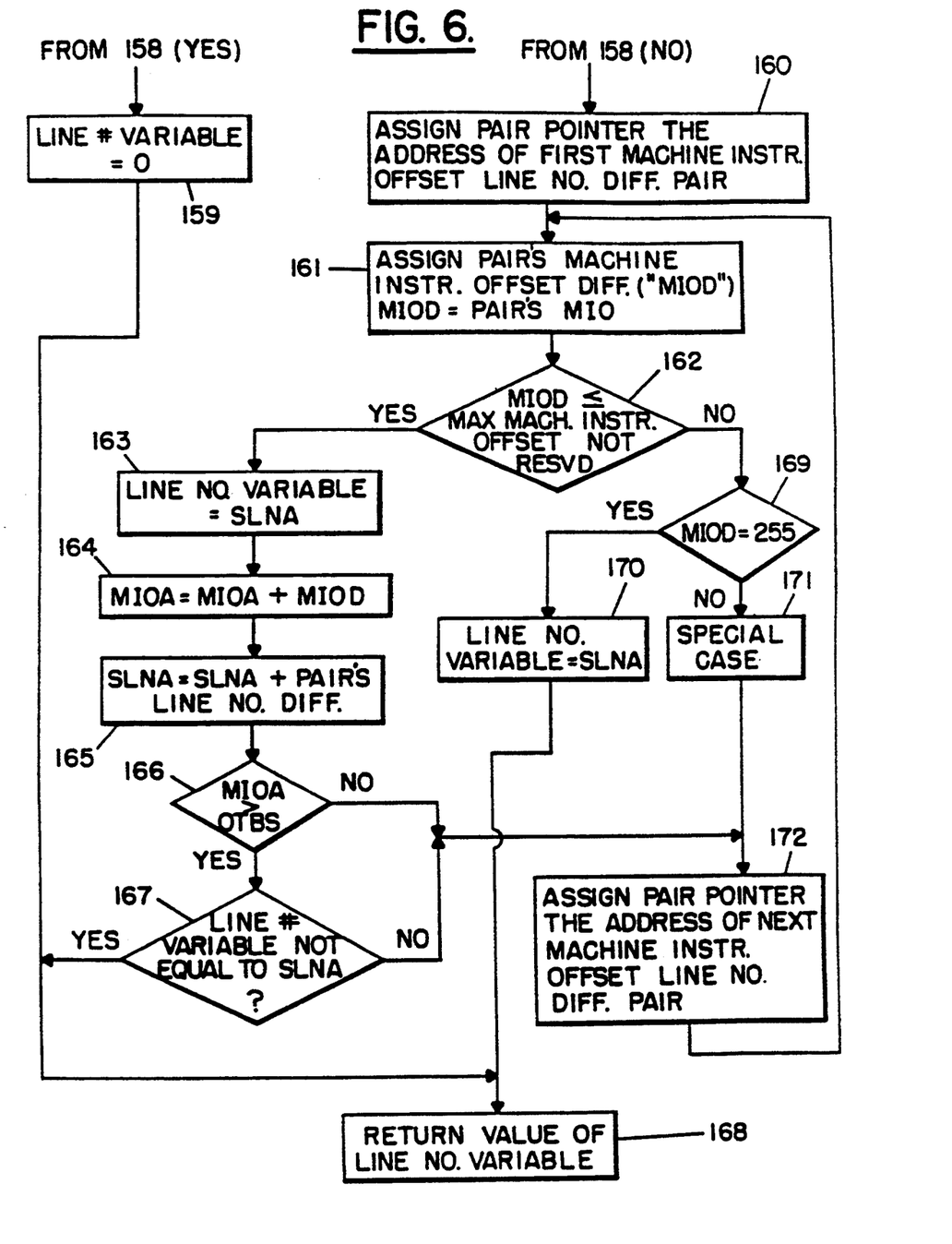

| FIG. 5/6 box | LINE NUMBER VARIABLE | PAIR pointer FIG. 4 | Machine Instruction Offset Accumulator variable | Source Line Number Accumulator variable | Machine Instruction Offset Difference variable |
| --- | --- | --- | --- | --- | --- |
| 156 | — | — | 0 | — | — |
| 157 | — | — | 0 | 1 | — |
| 158 | — | — | 0 | 1 | — |
| 160 | — | 105, 106 | 0 | 1 | — |
| 161 | — | 105, 106 | 0 | 1 | 10 |
| 163 | — | 105, 106 | 0 | 1 | 10 |
| 164 | 1 | 105, 106 | 10 | 1 | 10 |
| 165 | 1 | 105, 106 | 10 | 2 | 10 |
| 172 | 1 | 107, 108 | 10 | 2 | 10 |
| 161 | 1 | 107, 108 | 10 | 2 | 20 |
| 163 | 2 | 107, 108 | 10 | 2 | 20 |
| 164 | 2 | 107, 108 | 30 | 2 | 20 |
| 165 | 2 | 107, 108 | 30 | 3 | 20 |
| 172 | 2 | 110, 111 | 30 | 3 | 20 |
| 161 | 2 | 110, 111 | 30 | 3 | 250 |
| 163 | 3 | 110, 111 | 30 | 3 | 250 |
| 164 | 3 | 110, 111 | 280 | 3 | 250 |
| 165 | 3 | 110, 111 | 280 | 3 | 250 |
| 172 | 3 | 112, 113 | 280 | 3 | 250 |
| 161 | 3 | 112, 113 | 280 | 3 | 150 |
| 163 | 3 | 112, 113 | 280 | 3 | 150 |
| 164 | 3 | 112, 113 | 430 | 3 | 150 |
| 165 | 3 | 112, 113 | 430 | 4 | 150 |
| 172 | 3 | 114, 115 | 430 | 4 | 150 |
| 161 | 3 | 114, 115 | 430 | 4 | 10 |
| 163 | 4 | 114, 116 | 430 | 4 | 10 |
| 164 | 4 | 114, 116 | 440 | 4 | 10 |
| 165 | 4 | 114, 116 | 440 | 131 | 10 |
| 172 | 4 | 116, 117 | 440 | 131 | 10 |
| 161 | 4 | 116, 117 | 440 | 131 | 0 |
| 163 | 131 | 116, 117 | 440 | 131 | 0 |
| 164 | 131 | 116, 117 | 440 | 131 | 0 |
| 165 | 131 | 116, 117 | 440 | 200 | 0 |
| 172 | 131 | 118 | 440 | 200 | 0 |
| 161 | 131 | 118 | 440 | 200 | 255 |
| 162 | 131 | 118 | 440 | 200 | 255 |
| 169 | 131 | 118 | 440 | 200 | 255 |
| 170 | 200 | 118 | 440 | 200 | 255 |

It should be understood that the foregoing description is only illustrative of the invention. Various alternatives and modifications can be devised by those skilled in the art without parting from the invention. Accordingly, the present invention is intended to embrace all such alternatives, modifications, and variances which fall within the scope of the intended claims.

We claim:

1. In a method of translating the contents of source code files into a machine executable code file using a computer system with one or more compilers and a linker, each source code file having procedures, the line number of each line of source code in each source code file being determined by a compiler and read by the linker, the method of translating a procedure in a source code file into the machine executable code file comprising the steps of:

a. generating, by a compiler, an object code file for the procedure;

b. reading, by the linker, the object code file;

c. determining, by the linker, how the object code file will be organized in the machine executable code file;

d. translating, by the linker, the object code file into machine executable codes having one or more lines and each line having a line number;

e1. generating, by the linker, an unwind table for the procedure, the unwind table comprising a first entry, which is the address of the first machine executable code of the machine executable code file of the procedure; and     f1. generating, by the linker, a line number table to track the contents of the source code file to the contents of the machine executable code, the line number table having         a first entry indicating an offset from two addresses, the first address being the address of a first machine executable code in the block of machine executable codes generated by the procedure, the second address being the address of a first machine executable code in a block of machine executable codes generated by a first source code line in said procedure,         a second entry indicating the line number of the first source code line, and         a plurality of pairs of difference entries, for each pair of difference entries,             one entry being a difference between the line number of a current source code line and a previous source code line immediately before the current source code line, and             the second entry being a difference between the addresses of two machine executable codes, one being the first machine executable code from the block of machine executable code generated by the current source code line, and the other being the first machine executable code from the block of machine executable code generated by the previous source code line;

such that when an exception occurs at one of the machine executable codes at run-time, the line number table and the unwind table of the procedure corresponding to the machine executable code are used to locate the particular source code line which corresponds to the machine executable code having the exception, and the method, as performed by the software system, comprises the steps of:

g. adding the first entry of the unwind table for the procedure to the first entry of the line number table to generate the value for the machine instruction offset accumulator variable;

h. retrieving the second entry from the line number table to generate the value for the source line number accumulator variable;

i. comparing the value of the machine instruction offset accumulator variable to the address of the machine executable code having the exception;

j. returning zero to the address of the particular source code line and stopping the method if the address of the machine executable code having an exception being less than the value of the machine instruction offset accumulator variable;

k. checking the next entry in the line number table;

l. returning the value of the source line number accumulator variable to be the address of the particular source code line and stopping the method if the next entry being the final code indicator;

m. adding the first entry in the next pair of difference entries into the value in the source line accumulator variable and adding the second entry in that pair of difference entries from the line number table to the machine instruction offset accumulator variable;

n. comparing the value in the machine instruction offset accumulator variable to the address of the machine executable code having the exception;

o. subtracting from the value in the source line accumulator variable the first entry in the pair of difference entries in the line number table and returning the value in the source line number accumulator variable to be the address of the particular source code line and stopping the method if the address of the machine executable code having the exception being less than the value in the machine instruction offset accumulator variable address; and     p. repeating steps k to o until the method is stopped.

* * * * *

UNITED STATES PATENT AND TRADEMARK OFFICE
CERTIFICATE OF CORRECTION

PATENT NO.    : 5,339,431                                       Page 1 of 1
DATED         : August 16, 1994
INVENTOR(S)   : Richard R. Rupp, Cary A. Coutant and Joseph A. Coha It is certified that error appears in the above-identified patent and that said Letters Patent is hereby corrected as shown below:

<u>Title page,</u>
Inventors, line 1, delete "Gary" and insert therefor -- --

Signed and Sealed this

Sixteenth Day of April, 2002

Attest:

JAMES E. ROGAN
*Attesting Officer*          *Director of the United States Patent and Trademark Office*